Figure 1:
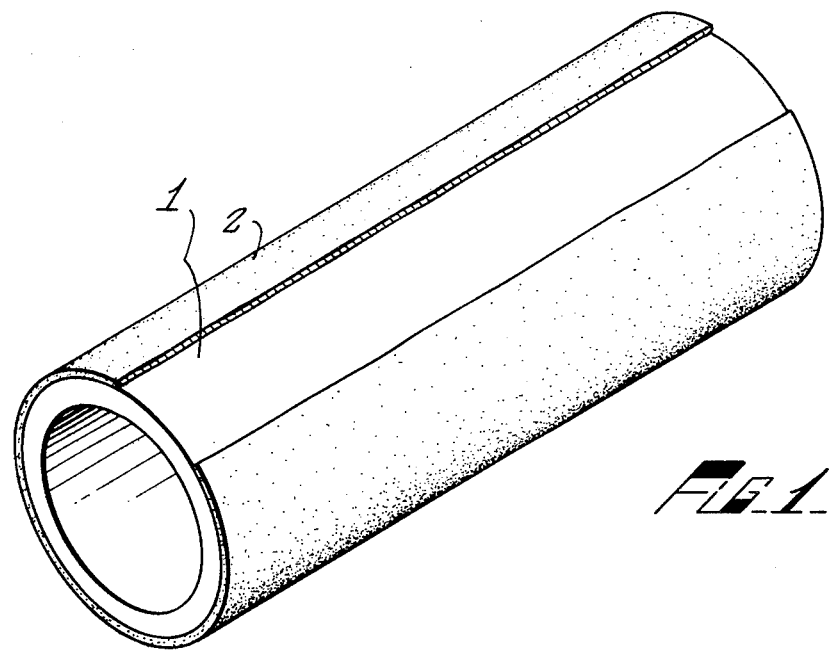

United States Patent [19]

Wetmore

[11] 4,170,296
[45] Oct. 9, 1979

[54] SELF-HEATING ARTICLES AND PROCESS

[75] Inventor: Judson D. Wetmore, San Diego, Calif.

[73] Assignee: Raychem Corporation, Menlo Park, Calif.

[21] Appl. No.: 526,458

[22] Filed: Nov. 25, 1974

Related U.S. Application Data

[62] Division of Ser. No. 3,563, Jan. 7, 1970.

[51] Int. Cl.² ............................................. B65D 25/08
[52] U.S. Cl. .............................. 206/219; 215/DIG. 8; 126/263; 252/74
[58] Field of Search .............................. 206/219–222; 215/DIG. 8

[56] References Cited

U.S. PATENT DOCUMENTS

| 2,615,443 | 10/1952 | Sukacev | 206/219 |
| 3,315,986 | 4/1967 | Quick | 285/21 |
| 3,385,922 | 5/1968 | Rice | 206/219 |

Primary Examiner—Joseph Man-Fu Moy
Attorney, Agent, or Firm—Lyon & Lyon

[57] ABSTRACT

This invention relates to a heat recoverable article having a self contained heat source comprising a heat recoverable polymer and a material capable of undergoing an exothermic chemical reaction said exothermic material being attached to the outer surface of said heat recoverable polymer, wherein, the outer surface of said polymer material is enclosed in a container having separate compartments containing two materials which react to produce heat, the partition between said materials being capable of being destroyed upon the application of tension or a shearing force to provide for mixing of the materials.

16 Claims, 2 Drawing Figures

U.S. Patent

Oct. 9, 1979

4,170,296

SELF-HEATING ARTICLES AND PROCESS

This is a division, of application Ser. No. 3,563, filed Jan. 7, 1970.

This invention relates to heat recoverable articles with a self-contained heat source. Heat recoverable articles have a very large number of commercial uses, for example, when manufactured from plastic and rubber materials, these heat recoverable articles are particularly useful as electric insulation and encapsulating devices.

The principal property of heat recoverable articles that makes them unique and useful is that upon application of heat, the articles will change size, shape and dimension and return or attempt to return to some predetermined size, shape or dimension. The use of these articles finds particular utility because of the ease of installing the article over or about other devices, components, parts of shapes which are to be electrically insulated or encapsulated or in some means protected from an environment, insulated electrically or insulated from heat. Upon the brief application of increased temperature by exposure to a heat source, the articles will change size and shape and during the recovery process, tighten down around or expand out into or in some direction meet interference with the part that is to be clad or protected. Thus, this heat recovery phenomenon provides a quick, efficient and reliable technique for providing protective coatings, surfaces, claddings and insulations. Commercially available heat recoverable parts are manufactured in the form of hollow cylindrical tubes and sleevings and in the form of molded parts. They have found commercial acceptance and utility in the field of electrical insulation and corrosion protection in cable terminations, feed through assemblies, pipe linings, identification sleeves, and many other applications. The utility of these items is based upon the fact that they are fabricated in one size and shape followed by a purposeful distortion under controlled conditions and then set in the distorted shape. Subsequent heating of these items permits a product to attempt to return to its initial fabricated size and shape.

Two methods can be used to produce these heat recoverable articles. The first consists merely of exposing a thermoplastic material to a carefully controlled amount of heat which is insufficient to allow the material to melt and flow but sufficient to allow the molecular structure to become distorted and then distorting the structure to a new configuration followed by immediate cooling or quenching of the distorted article. Subsequent increases of temperature sufficient to reduce the locked in stresses caused by the initial plastic deformation will allow the article to return to its normal shape. However, if the temperature is not closely controlled, the material will melt and flow and the article will no longer be functional.

More recently, a second phenomenon has been used to produce heat recoverable products where the disadvantages of the predescribed products are eliminated. Articles are first fabricated in the final desired size and shape and then crosslinked in this position. The crosslinking can be accomplished by the use of high energy radiation or chemical crosslinking techniques or by combinations of the two. Subsequent heating of the material will melt the crystals in a crystalline thermoplastic material or significantly lessen other internal molecular forces such as hydrogen bonding or dipole-dipole interactions to an extent sufficient to allow distortion of the product. Close temperature control is not an important factor in this type of heat recoverable material since the crosslinked material does not flow at elevated temperatures. Quenching of the heated and distorted crosslinked material will result in a product which is in its distorted shape while at room temperature. Reheating of the product sufficient to melt the crystals and/or reduce other intermolecular forces will allow the crystalline material to quickly return the product to its initial crosslinked size and shape.

In the use of heat recoverable parts, many different methods of increasing the temperature to bring about a recovery have been used. Common methods of heating include convection wherein hot air is directed at the parts; radiant heating wherein infrared lamps or catalytic heaters are used and conduction wherein the article is contacted with heated and shaped metal or other elements or is immersed in hot fluids. In some instances, direct flame application may be used to rapidly increase the temperature if proper precautions are taken to avoid burning or degrading the product.

One important deficiency, however, in the use of heat recoverable parts has become apparent in recent years. It is frequently desired to have heat recoverable articles which can be used without external sources of heat and power. The use of heat recoverable sleeves on telephone lines and electrical lines both when suspended on telephone poles or in the ground is not practical when heat sources requiring electrical power to activate their heating cannot be used due to the lack of proximity to an electrical power source. In addition, open flame cannot be used in some cases because of the danger to the workmen and the danger of explosion in underground locations. Futhermore, many regulations prohibit the use of open flame or catalytic devices. Battery powered portable devices overcome some of these problems but are often much too heavy and too expensive to be considered practical for important commercial utilization of heat recoverable articles.

Accordngly, it is a primary object of the present invention to provide novel heat recoverable articles of manufacture capable of changing size and/or shape upon the release of heat from a self-contained heat source.

Another object of the invention is to provide a process for producing novel heat recoverable articles having a self-contained heat source.

It is a further object of the present invention to provide heat recoverable articles having a self-contained heat source which can be activated by the application of a commonly available activator.

Figure 2:
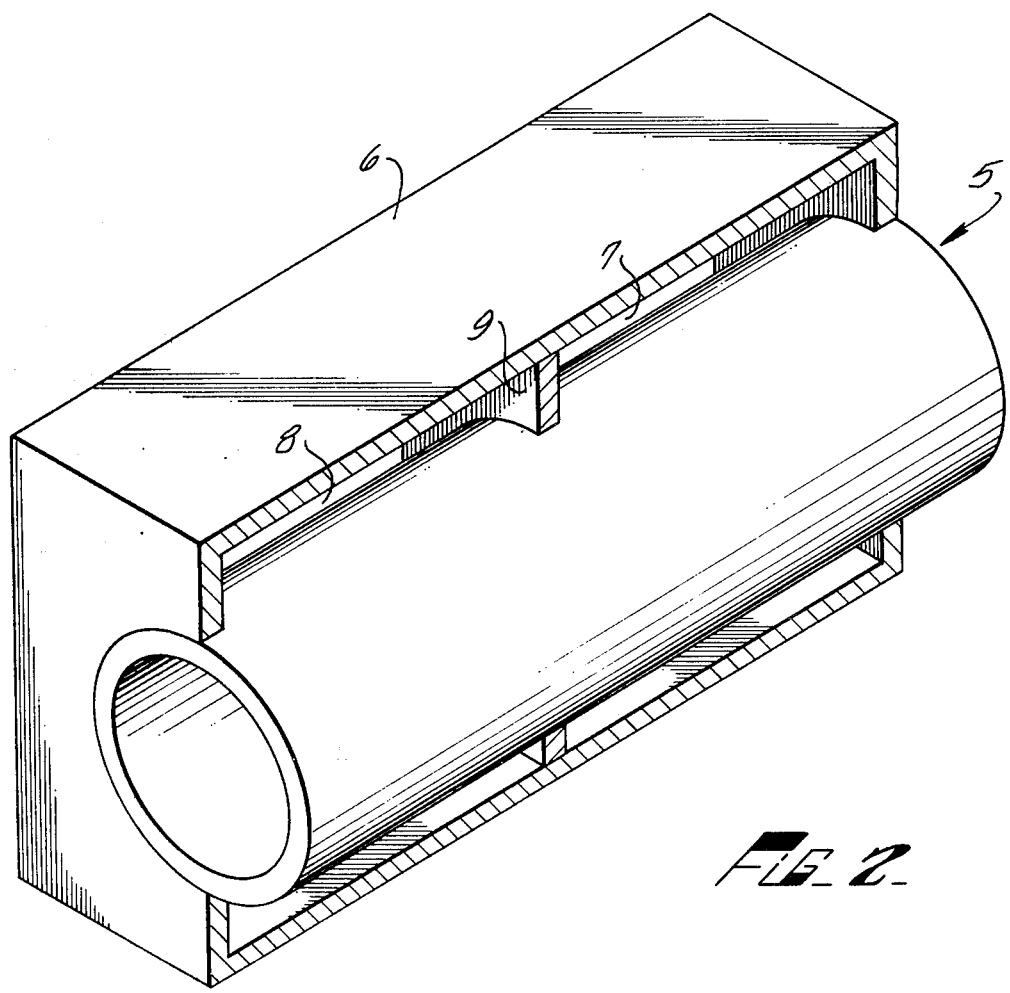

In the accompanying drawings,

FIG. 1 is a partially cut-away perspective view demonstrating one illustrative embodiment of the present invention and FIG. 2 is a partial cross-section view illustrating another embodiment.

Briefly, this invention comprehends within its scope the discovery that exothermic reactions can be caused to take place in or near heat recoverable articles to release heat sufficient to increase the temperature of the article allowing them to return to their original predetermined size and shape. Thus, materials are incorporated with the heat recoverable part which are capable of undergoing exothermic reaction whereby sufficient heat is released in this reaction to increase the temperature of the part to bring about heat recovery. The materials capable of undergoing an exothermic reaction may be activated upon the simple application of pressure, vibration, mechanical force, addition of an activating chemical such as water, etc.

A basic requirement of the exothermic material is that its heat of reaction is sufficient to raise the temperature of the heat recoverable article to the point at which recovery occurs. Of course, it is also important that the amount of heat produced is not so great as to melt, decompose, or otherwise render the article non-functional. The application of too much heat can be prevented by using controlled amounts of highly exothermic reactants.

A very common exothermic reaction is the burning of a material in oxygen. Materials which can be easily ignited, e.g., contacted with a burning match, and which will generate sufficient heat to shrink the article may be employed. Thus, the self-contained heat source might be ammonium dichromate or powdered sulfur which upon contact with a burning match will ignite and produce sufficient heat to shrink the article although the heat of the match alone would have been insufficient.

In general, any exothermic reaction may be used in the present invention. Particularly, suitable material are those exothermic reactants which produce a sufficient amount of heat to cause recovery without overheating the recoverable article, are easily activated, and do not produce undesirable by-products. Good results have been obtained when one of the reactants is a liquid. A liquid results in rapid and uniform mixing of the reactants thus providing a quick and uniform application of heat to the recoverable article. Examples of systems employing a liquid are aluminum trichloride-water and ammonium chloride-water.

A mixture of various exothermic reactants may be used to take advantage of the desirable properties of the components. Thus, by mixing one component which reacts to produce a great deal of heat with another component which reacts more slowly and produces a sustained reaction, it may be possible to obtain a sustained high temperature for a period sufficient to result in recovery of the article. Various other combinations of materials may be made to take advantage of properties such as temperature and moisture stability, aging stability, etc.

The self-contained heat source may be incorporated with the recoverable articles by any of the number of suitable methods. The exothermic material may be bonded or otherwise applied to the outside or inside of a heat recoverable article such as a tube. Thus, as illustrated in FIG. 1 a paste of an exothermic reactant such as aluminum trichloride and a heavy grease or resin binder may be applied to the outside of a heat recoverable tube 1 as a coating 2. Upon the application of water, heat will be generated causing the tube to shrink to its predetermined dimension. Alternatively, the paste of exothermic reactant may be applied to a sheet of paper or other wrapper which is subsequently applied to the outside of the tube. Futhermore, both reactants, e.g., aluminum chloride and water may be incorporated with the heat recoverable article. Of course, a method of separating the reactants until the application of heat is desired must be employed. Thus, as shown in FIG. 2 a heat recoverable tube 5 may be surrounded by a container 6 of plastic or other material having two separate compartments 7 and 8, one for each of the reactant materials. By making the wall 9 between the compartments weaker than the outer wall of the container, it is possible to break the wall between the compartments through the application of pressure or a shearing action. The two reactant components will then become mixed together resulting in the application of heat directly to the tube.

It is also within the scope of the present invention to incorporate the exothermic material into the heat recoverable article itself. Thus, material which will react exothermically upon the application of an initiator may be dispersed throughout the memory material. Upon the initiation of reaction, the exothermic material will react within the heat recoverable material causing it to increase in temperature and thus recover. The exothermic material may be dispersed uniformly throughout the memory material or it may be concentrated in one section of the memory article. For example, a tube of memory material may contain a concentration of exothermic material in an area defined by a cylinder, lying within and concentric with the tube. By concentrating the exothermic material near the outer surface of the heat recoverable material, it is made easily accessible for initiation of the exothermic reaction.

This invention can be more fully understood by reference to the following examples.

EXAMPLE 1

A sample of expanded, crosslinked polyurethane tubing was prepared by extruding the tubing to an I.D. of 0.270 inch, irradiating and subsequently expanding the tubing at an elevated temperature to an I.D. of 0.505 inch. Similarly a sample of expanded, crosslinked Kynar, polyvinylidene fluoride tubing was prepared such that its original extruded I.D. was 0.110 inch and its expanded diameter was 0.261 inch. Ten grams of aluminum chloride were then mixed with silicone stopcock grease to a thick paste. A section of expanded polyurethane tubing was then coated with the thick paste and water was carefully poured on this section. An exothermic reaction occurred with the liberation of hydrochloric acid. At the completion of the reaction, the tubing was washed thoroughly with water and the internal diameter was measured.

In a similar experiment, glycerine was substituted for silicone stopcock grease as the thickening agent and sections of both polyurethane and polyvinylidene fluoride tubing were coated and subsequently subjected to water. In both cases an exothermic reaction occurred with the liberation of hydrochloric acid. The results are summarized below.

| Tubing | Treatment | Expanded I.D. Before Treatment (inch) | I.D. After Treatment (inch) |
| --- | --- | --- | --- |
| Polyurethane | $AlCl_3$ in silicone stopcock grease + $H_2O$ | 0.505 | 0.290 |
| Polyurethane | $AlCl_3$ in glycerine + $H_2O$ | 0.505 | 0.290 |
| Polyvinylidene | $AlC_3$ in glycerine | 0.261 | 0.261 |

| Tubing | Treatment | Expanded I.D. Before Treatment (inch) | I.D. After Treatment (inch) |
|---|---|---|---|
| fluoride | + H₂O | | |

It can readily be seen that the polyurethane tubing recovered essentially to its extruded diameter while the polyvinylidene fluoride tubing did not recover at all. The reason this occurred is simply that the polyurethane tubing will recover at a temperature of approximately 100° C. while the polyvinylidene fluoride tubing will recover at a temperature of approximately 170° C. The exothermic reaction generated enough heat to recover the polyurethane tubing but not enough heat to recover the polyvinylidene fluoride tubing.

EXAMPLE 2

This example illustrates another chemical method of generating an exothermic reaction by using a section of Thermofit RNF, a commercial heat shrinkable tubing comprising crosslinked polyethylene, treated in the following manner. A mixture comprising by weight one part of ammonium chloride, two parts of cupric oxide, four parts of 100 mesh iron, four parts of 10 mesh iron and one part of alum chips was dry mixed and formed into a package by making a sandwich construction with a paper towel and taping the ends closed. The package was then wrapped around a one-inch piece of the Thermofit tubing and taped in place. Water was applied and after 60 second sufficient heat was generated to shrink the tubing to its pre-expanded size. No apparent adverse effects on the tubing were observed.

The exothermic reaction may be one which is brought about by an initial ignition and then proceeds by a reaction with the oxygen in air. Examples of such exothermic reactions follow.

EXAMPLE 3

Ammonium dichromate was crushed with a mortar and pestle to a fine powder and mixed with gum arabic and water to a stiff paste. The paste was applied to samples of crosslinked, expanded polyurethane, polyethylene and polyvinylidene fluoride tubings and left to air dry for 24 hours. The outer coating was then ignited with a match whereupon the ammonium dichromate exothermically decomposed. After the reaction had ceased and the materials had cooled to room temperature, the internal diameters were measured with the following results:

| Tubing | Expanded I.D. Before Treatment (inch) | I.D. After Treatment (inch) |
|---|---|---|
| Polyurethane | 0.505 | Sample degraded and flowed |
| Polyethylene | 0.625 | 0.377 |
| Polyvinylidene fluoride | 0.261 | 0.113 |

EXAMPLE 4

Powdered sulfur was mixed to a thick paste with gum arabic and water and applied to the same tubings used in Example 3. After drying the coating for 24 hours, the coating was ignited with a match. After the reaction had ceased and the materials had cooled to room temperature, the internal diameters were measured with the following results:

| Tubing | Expanded I.D. Before Treatment (inch) | I.D. After Treatment (inch) |
|---|---|---|
| Polyurethane | 0.505 | Sample decomposed and flowed |
| Polyethylene | 0.625 | 0.397 |
| Polyvinylidene fluoride | 0.261 | 0.113 |

In both Examples 3 and 4, the polyurethane tubing decomposed and flowed while both the polyethylene and polyvinylidene fluoride recovered to essentially their pre-expanded diameters. The reason for these results is simple due to the fact that polyurethanes will pyrolytically decompose at significantly lower temperatures than will either polyethylene or polyvinylidene fluoride. This again demonstrates the importance of choosing the correct temperature range to effect the exothermic shrinking of a heat recoverable article.

EXAMPLE 5

A standard road flare was cut open and the contents removed and mixed to a stiff paste with gum arabic and water. Samples of expanded, crosslinked polyvinylidene fluoride tubing, polyethylene tubing and expanded polytetrafluoroethylene tubing were coated with the mixture and allowed to dry for 24 hours. Upon ignition, all samples melted and decomposed. This illustrates the fact that very high temperatures are attainable by exothermic reactions, and again points out the necessity to control the temperature range when dealing with heat shrinkable plastics.

Having fully described the invention, it is intended that it be limited only by the lawful scope of the appended claims.

I claim:

1. A heat recoverable article of manufacture having a self contained heat source comprising a heat recoverable polymer and a material capable of undergoing an exothermic chemical reaction, said exothermic material being attached to the outer surface of said heat recoverable polymer, wherein the outer surface of said polymer material is encased in a container having separate compartments containing two materials which will react to produce heat, the partition between said materials being capable of being destroyed upon the application of tension or a shearing force to provide for mixing of the materials.

2. The article of claim 1 wherein one of said separate compartments contains said exothermic material and the other of said separate compartments contains water, which will react together to produce heat upon destruction of said partition.

3. The article of claim 2 wherein said exothermic material is aluminum chloride.

4. The article of claim 2 wherein said exothermic material is ammonium chloride.

5. The article of claim 2 wherein said exothermic material is a mixture of ammonium chloride, cupric oxide, iron and alum.

6. The article of claim 1 wherein said polymer is crosslinked.

7. The article of claim 6 wherein said polymer is polyethylene.

8. The article of claim 6 wherein said polymer is polyvinylidene fluoride.

9. The article of claim 6 wherein said polymer is polyurethane.

10. The article of claim 1 wherein said article is a heat recoverable tube.

11. A heat recoverable article of manufacture comprising a heat recoverable tube encased within a plastic container having separate compartments therein, one of said separate compartments containing a material capable of undergoing an exothermic chemical reaction and the other of said separate compartments containing a material capable of reaction with said first material to produce heat, and a partition between said compartments capable of being destroyed upon application of tension or a shearing force to provide for mixing of said materials.

12. The heat recoverable article of claim 11 wherein one of said separate compartments contains said exothermic material and the other of said separate compartments contains water which will react together to produce heat upon destruction of said partition.

13. The heat recoverable article of claim 11 wherein said exothermic material is selected from the group consisting of aluminum chloride, ammonium chloride and a mixture of ammonium chloride, cupric oxide, iron and alum.

14. The heat recoverable article of claim 11 in which said tube is formed from a heat recoverable polymer.

15. The heat recoverable article of claim 14 in which said polymer is crosslinked.

16. The heat recoverable article of claim 15 wherein said crosslinked polymer is selected from the group consisting of polyethylene, polyvinylidene fluoride and polyurethane.

* * * * *